Figure 1:
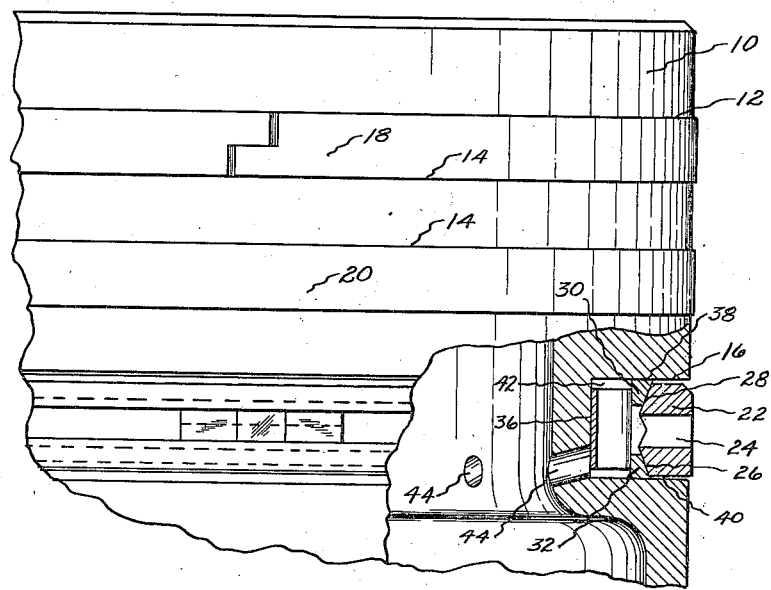

Nov. 9, 1937.        F. A. LUTHY        2,098,901
PISTON RING
Filed May 14, 1936

Inventor
Frederick. A. Luthy
By Beaman & Langford
Attorney

Patented Nov. 9, 1937

2,098,901

UNITED STATES PATENT OFFICE 2,098,901

PISTON RING

Fredrick A. Luthy, Jackson, Mich.

Application May 14, 1936, Serial No. 79,692

8 Claims. (Cl. 309—45)

The present invention relates to improvements in piston rings for internal combustion engines and is particularly concerned with improvements in multi-part oil rings of the inner expander spring type.

Heretofore it has been proposed to construct a compression ring as disclosed in Patent No. 1,576,402 with an outer ring section and a plurality of inner sealing rings which are deflected outwardly in opposite directions into contact with the side walls of the ring groove under the combined action of the inner expander spring and the outer ring section. Prior to the present invention this construction has been limited to compression rings and no commercial attempt has been made nor the advantages apparently recognized of constructing a multi-part oil ring utilizing the same general principles yet permitting oil from the cylinder walls to be drawn in through the usual radially extending ports circumferentially spaced about the oil ring and to be by-passed through ports in the ring groove into the interior of the piston and hence to the crankcase.

For an oil ring to perform its function it is necessary that there be no tendency for the oil to be pumped through any clearance that might exist between the sides of the ring and the sides of the ring groove upon reciprocation of the piston in either direction. Moreover, if excessive oil is to be effectively wiped and/or removed from the cylinder wall by the oil ring, it is necessary that the outer face of the ring be held in contact throughout its width with the cylinder wall avoiding any "cocking" of the ring in its groove. In addition, the life and efficiency of an oil ring is increased if relative axial movement between the piston and the oil ring upon reciprocation is prevented.

One of the objects of the present invention is to provide an oil ring which is held in its groove in the piston in a position normal to the axis of the cylinder wall at all times during the reciprocation of the piston and lateral movement or "cocking" of the ring due to wear or improper fit is obviated.

Another object is to provide a multi-part oil ring through which the oil passes during removal of the oil from the cylinder wall in which provision is made for circulating the oil circumferentially of the groove past the inner expander spring for passage through ports in the ring groove opening into the hollow interior of the piston.

A further object is to provide a multi-part oil ring in which one or more inner sealing members are axially and resiliently displaced into contact with one or more sides of the groove in which the ring is located to seal any clearances between the sides of the groove and cylinder wall contacting part of the oil ring.

These and other objects and advantages residing in the specific construction and arrangement and combination of parts of my improved oil ring will be more fully set forth in the following details of description and will become apparent from consideration thereof.

In the drawing

Figure 2:
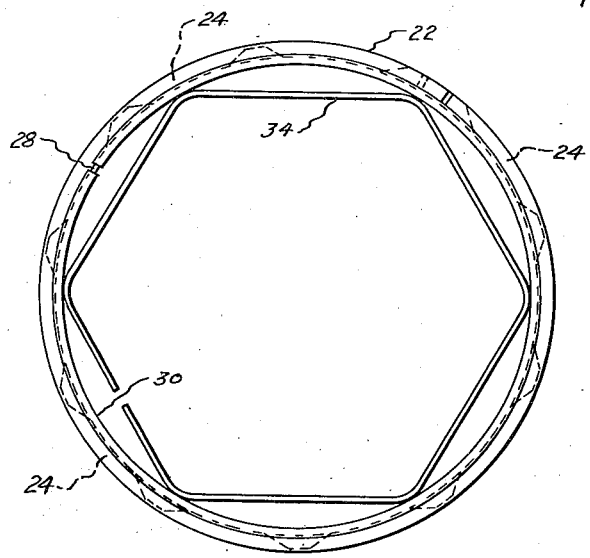

Fig. 1 is a fragmentary side elevational view partly shown in cross-section of a piston showing the improved oil ring in position, and Fig. 2 is a plan view showing the parts of the improved oil ring in assembled relation.

In Fig. 1 the piston 10 is shown with compression ring grooves 12 and 14 and oil ring groove 16. For the purpose of illustration conventional compression rings 18 and 20 are shown within the grooves 12 and 14. My improved oil ring shown in position within the groove 16 comprises an outer split ring section 22 of slightly less width than the groove 16 and ported circumferentially as at 24. The inner surface of the ring 22 has been beveled as at 26 and 28 to provide a pair of conical seat portions flaring outwardly from the median line of the ring 22. These seats extend circumferentially of the entire ring and are disposed upon opposite sides of the ports 24 as clearly appears from Fig. 1.

Coacting with the outer ring 22 and engaging with the seats 26 and 28 are split inner rings 30 and 32 which preferably, although not necessarily, have the outer face thereof beveled at an angle corresponding to that of the bevel of the seats 26 and 28. In order to obviate any restriction of the ports 24 the combined width of the inner rings 30 and 32 is substantially less than the width of the ring 22. A split expander spring 34 of wire stock of well known configuration is interposed between the wall 36 of the groove 16 and the inner rings 30 and 32. The expanding action of the spring 34 is indirectly applied to the outer ring 22 through the inner rings 30 and 32 to force the latter radially outward and axially in opposite directions into contact with the upper and lower walls 38 and 40 of the oil groove 16. As should be apparent, the axial movement of the inner rings 30 and 32 is due to the inclination of the seats 26 and 28. With the inner rings 30 and 32 providing a seal between the walls 38 and 40 and the upper and lower side of the outer ring 22 any tendency for oil to be pumped around the ring 22 either upon the compression or suction stroke of the piston is overcome. Preferably the expander spring 34 is of considerably less width than that of the groove 16 in order that there will be provided either above and/or below the spring 34 as at 42 a circumferentially extending oil passage for circulating any excessive amount of oil being removed from the cylinder wall along a particular arc of the oil ring for a more improved distribution and discharge of oil through the circumferentially spaced openings 44 in the piston extended between the oil groove 16 and the interior of the piston.

The inclination of the engaging surfaces, of either the outer ring 22 or the inner rings 30 and 32, or both, to the radial action of the expander spring 30 is accountable for the deflection of the inner rings 30 and 32 into sealing abutment with the walls 38 and 40 of the groove 16 and obviously the surface or surfaces may take shapes and forms other than that illustrated. In some cases it may be found desirable to employ only a single inner ring such as 30 or 32 and for this reason I do not wish to limit the invention to a pair of inner rings positioned on opposite sides of the ported area of the outer ring.

As should be readily appreciated, the action of the expander spring 34 and the inner rings 30 and 32 upon the outer ring 22 not only seals the outer ring in its groove 16 but also prevents the same from cocking in its groove or shifting laterally with the reciprocation of the piston.

Having described my invention, what I desire to protect by Letters Patent and claim is:

1. In a reciprocating piston having a ported ring groove, an oil ring for said piston comprising a split outer ring section located in said groove adapted to be radially expanded therein, said outer ring section having ports centrally disposed and circumferentially spaced therein, a pair of split inner sealing ring sections located within said groove for engagement with the inner periphery of said outer section, the combined width of said inner sealing sections being less than the width of said outer section, an expander spring engaging with said inner sealing sections, the construction of the engaging surfaces of said inner and outer ring sections being characterized by the fact that said inner sealing sections are moved axially in opposite directions into sealing engagement with opposite sides of said groove under the expanding action of said spring, the axial movement of said inner sealing sections disposing the same in an unobstructing position with reference to the ported areas of said outer ring section and the passage of oil between said areas and the port of said groove.

2. In the combination as set forth in claim 1 wherein the inner expander ring is of less width than said outer ring section and said groove whereby an oil channel is defined between said spring and groove circumferentially of the piston.

3. In the combination as set forth in claim 1 wherein the expander spring is shaped to engage said inner sealing sections at circumferentially spaced points and is of less width than said outer section and said groove whereby oil passages are defined between said spring and groove circumferentially and radially of the piston.

4. In combination with a piston of an internal combustion engine having a ring groove therein with oil ports opening into the interior of the piston, a multi-part oil ring assembled in said groove, said ring comprising an outer ring section having radially extending circumferentially spaced ports therein, a sealing member disposed between said outer section and said groove, a seat defined by the inner curved surface of said outer ring with which said sealing member engages, at least one of the engaging surfaces of said outer section and member being angularly disposed with reference to the axis of said piston, means defining an abutting surface disposed on the opposite side of said sealing member from said outer section, said sealing member upon being compressed between said outer section and said means being deflected axially of the piston against the wall of said groove, said sealing member being of less width than said outer section and being normally disposed in an unobstructing position with reference to the passing of oil through said ports and said groove and outer section.

5. A multi-part oil ring assembly for installation in a ring groove of a reciprocated piston comprising a split ported outer ring, a seat defined by the inner periphery of said outer section disposed to one side of the ported area thereof, an inner split ring section having a seat adapted to engage with the seat of said outer section, one of said seats being conical whereby upon relative radial expansion or contraction of said inner and outer sections relative axial movement of said sections is effected, an inner expander spring for engagement with the inner periphery of said inner section, said inner section being of less cross-sectional width than said outer section whereby the same occupies a non-obstructing position with reference to the ported area of said outer section when in position between said spring and outer section upon installation in a ring groove of a piston.

6. A multi-part oil ring assembly for pistons comprising an outer ring, an inner expander spring, an inner sealing member imposed between said outer ring and spring, a seat defined by the inner surface of said outer ring, a seat defined by the outer surface of said inner sealing member adapted to engage said seat on said outer ring to form a sealed joint, at least one of said seats being angularly disposed with reference to the axis of said outer ring whereby said inner sealing member is deflected in an axial direction upon relative expansion or contraction of said outer ring and spring, ports in said outer ring for passage of oil, said ports being unobstructed by said inner sealing member when positioned under the combined influence of said spring and seat upon said outer ring.

7. A multi-part oil ring assembly for pistons comprising an outer ring, radially extending ports in said outer ring, oppositely beveled seats extending on opposite sides of said ports circumferentially of said outer ring upon the inner side thereof, a pair of inner sealing rings having complementary beveled outer side portions adapted to engage with said seats to provide a sealed joint, an expander spring adapted to urge said inner rings into engagement with said seats to effect axial movement thereof in opposite directions, the combined width of said inner rings being less than the width of said outer ring whereby said inner rings assume an unobstructing position with reference to said part when positioned under the influence of said spring and the beveled seats of said outer ring.

8. An oil ring for installation in a ring groove of a reciprocated piston comprising an outer ring section having circumferentially spaced ports for the passage of oil, a seat defined by the curved inside of said outer section, an inner sealing ring section adapted to engage with said seat and having an outer diameter conforming generally to the inner diameter of said outer section, an inner spring adapted to act with radial action upon said outer and inner sections, at least one of the engaging surfaces of said seat and said inner section being angularly disposed to the radial plane of said outer section, said inner section being less than one-half the axial thickness of said outer section and when engaging with said seat under the action of said spring being disposed in an obstructing position with reference to said ports in said outer ring section.

FREDRICK A. LUTHY.